L. ARKIN.
CAMERA.
APPLICATION FILED MAY 14, 1915.
1,182,237.
Patented May 9, 1916.
5 SHEETS—SHEET 4.
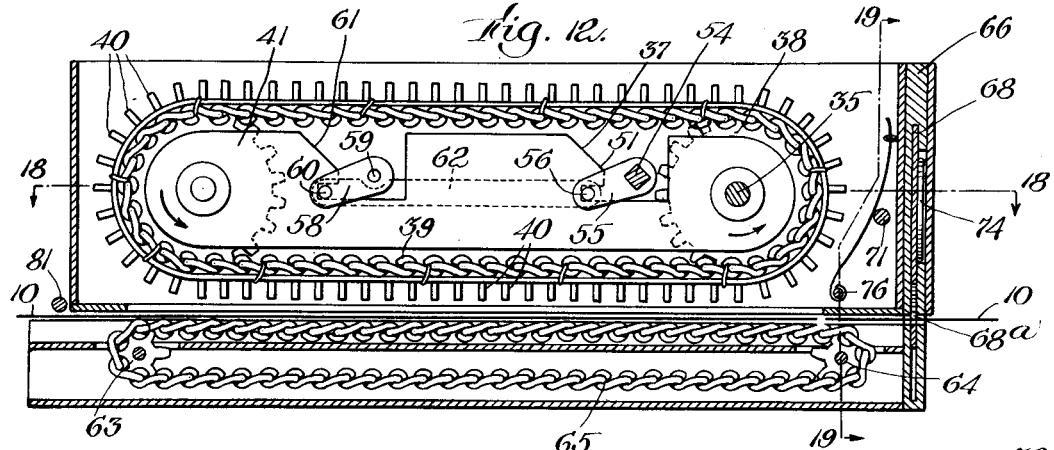
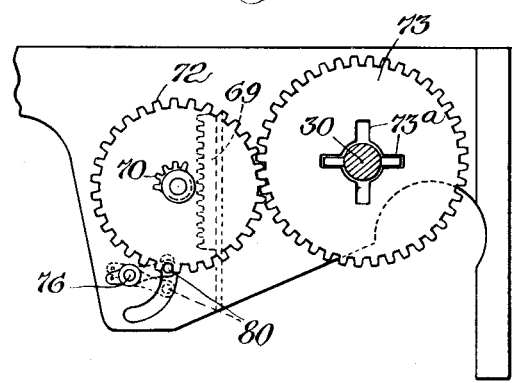
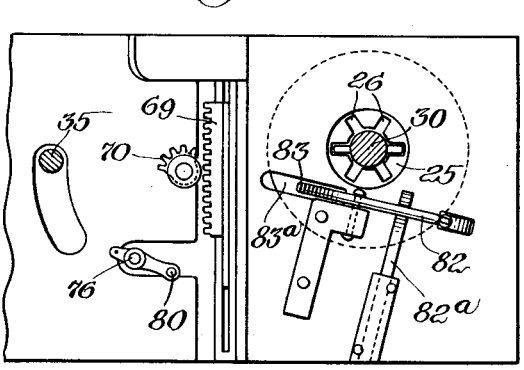
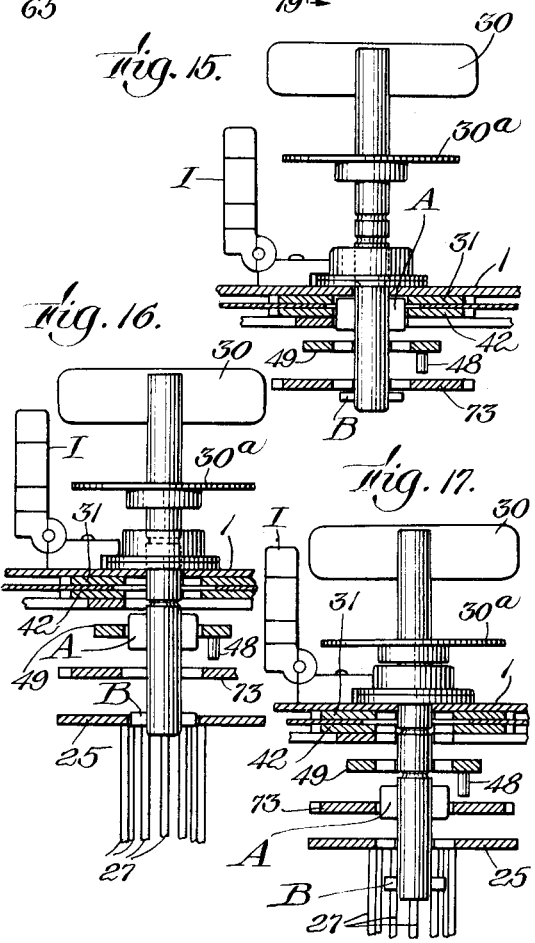
Witnesses:
Josephine H. Ryan
R. M. Barfield
Inventor:
Louis Arkin
by Roberts, Roberts & Cushman
Attorneys L. ARKIN.
CAMERA.
APPLICATION FILED MAY 14, 1915.
1,182,237.
Patented May 9, 1916.
5 SHEETS—SHEET 5.
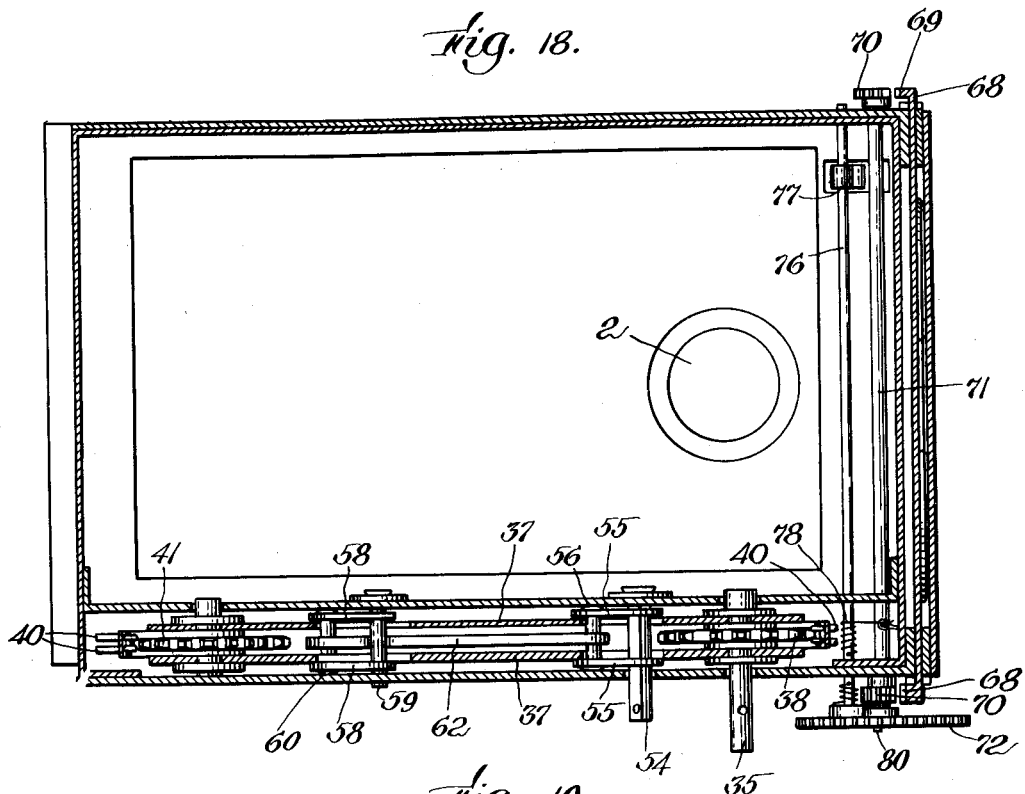
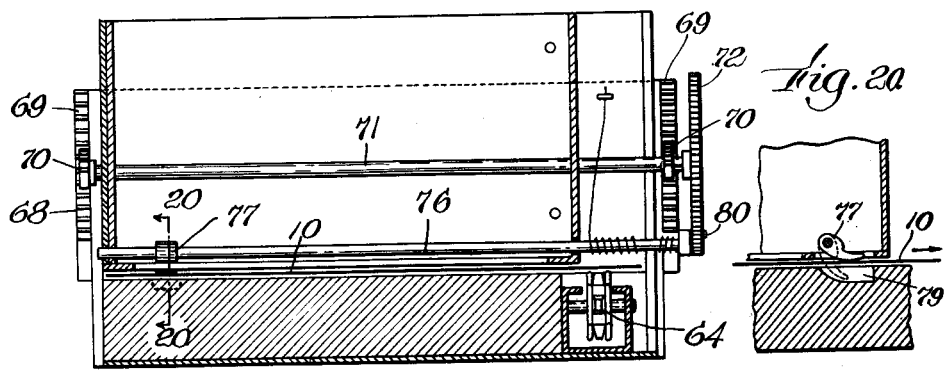
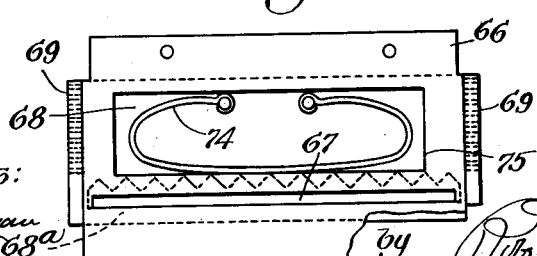

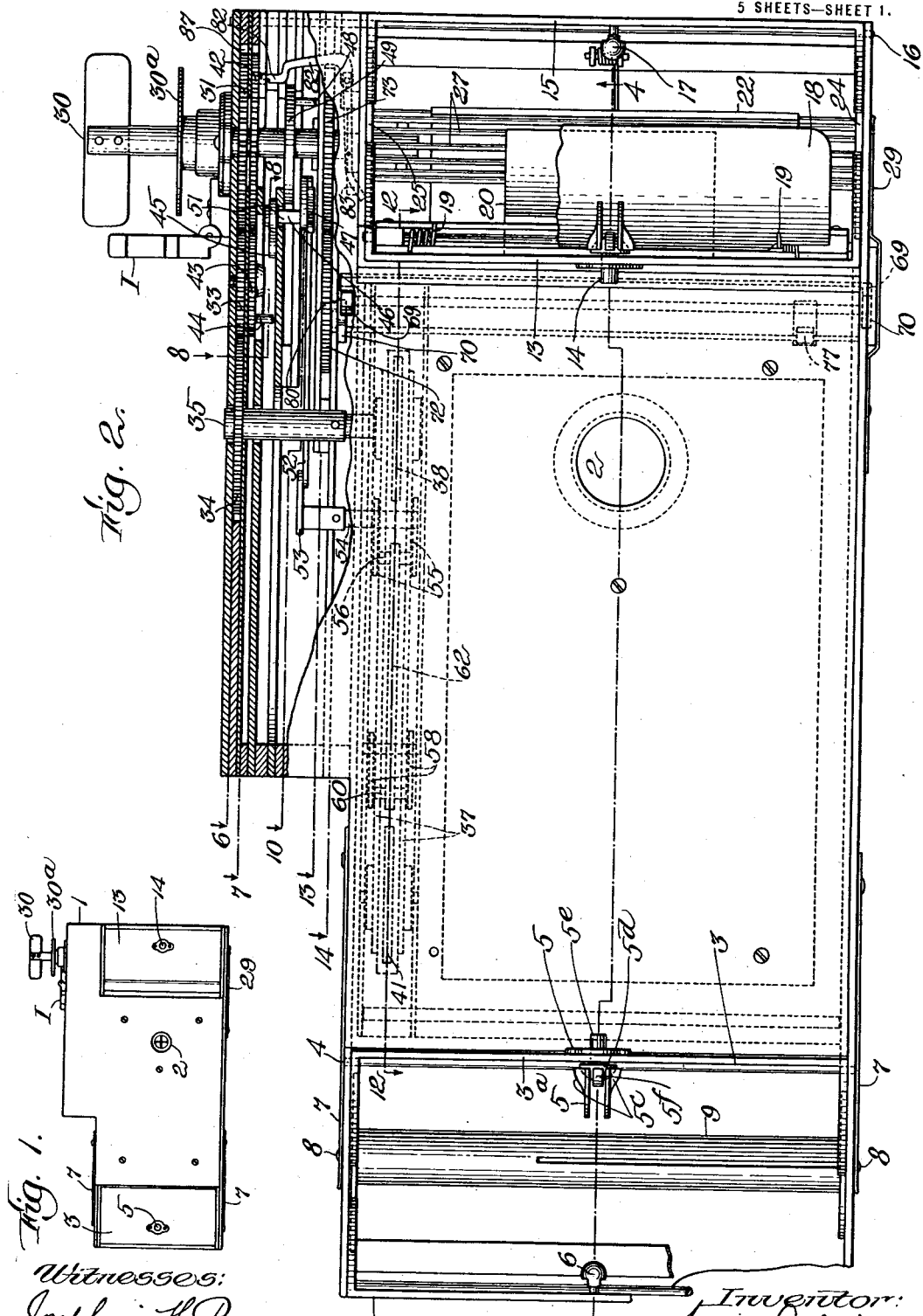

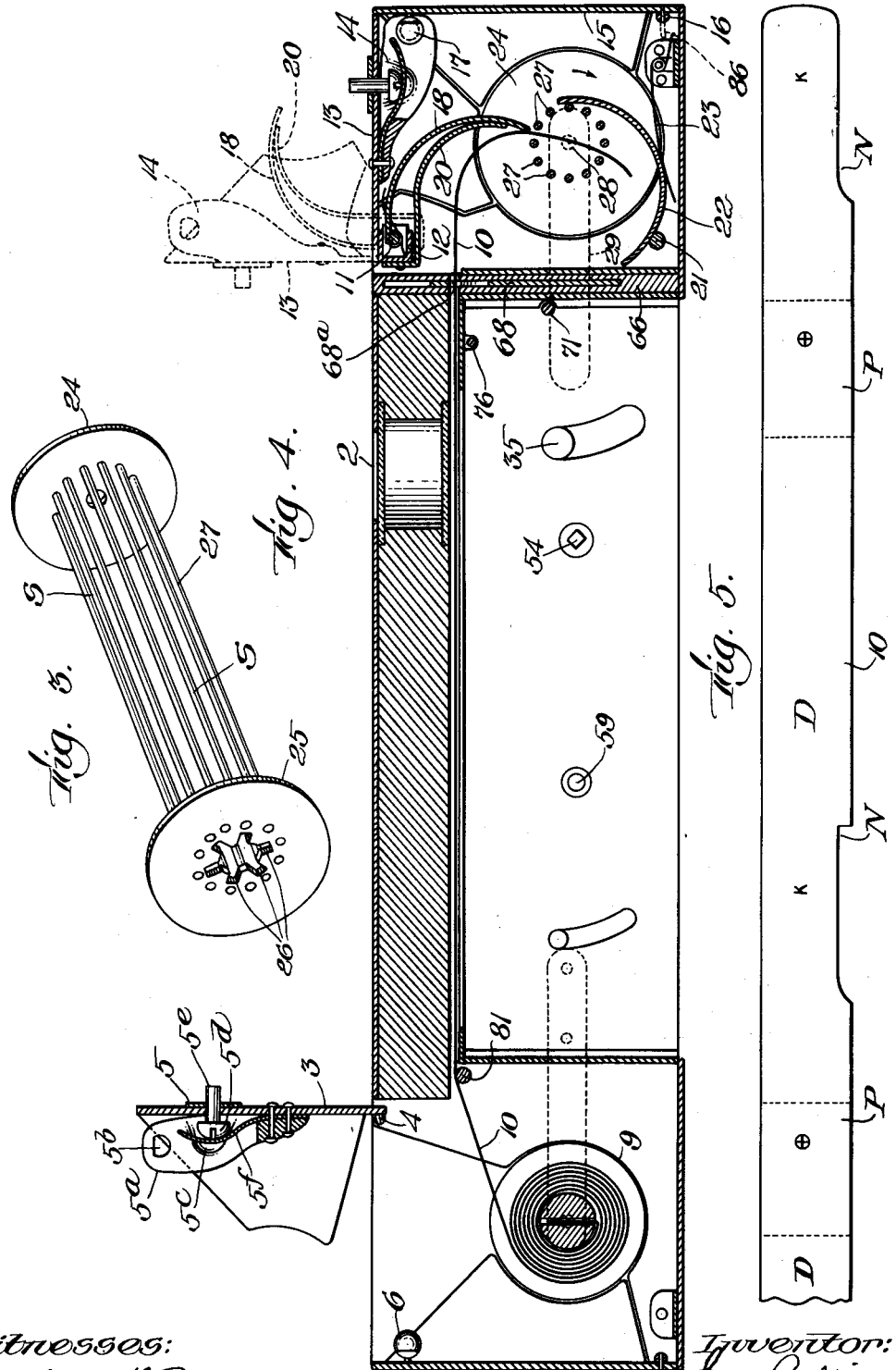

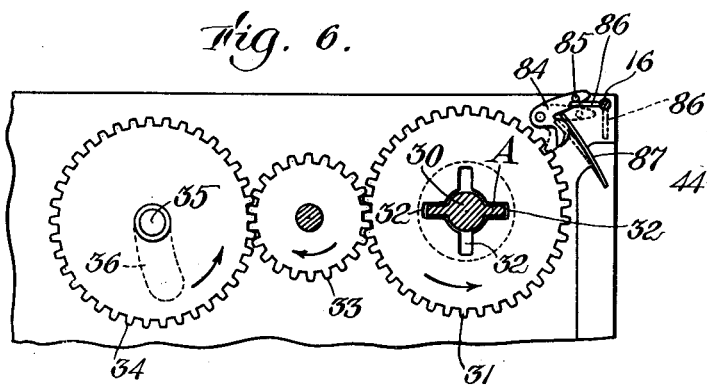
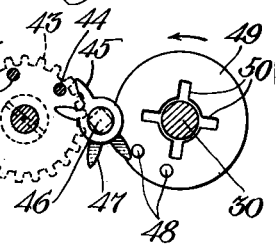
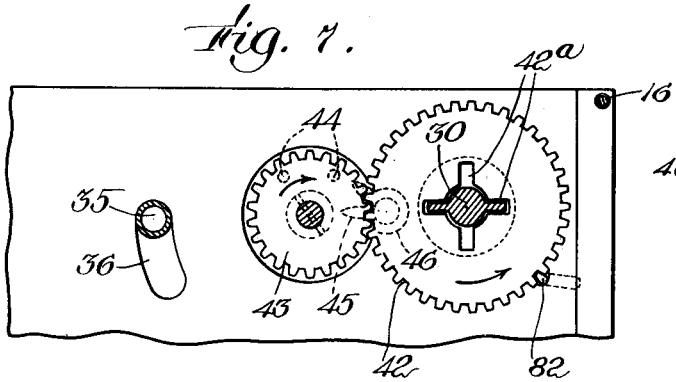
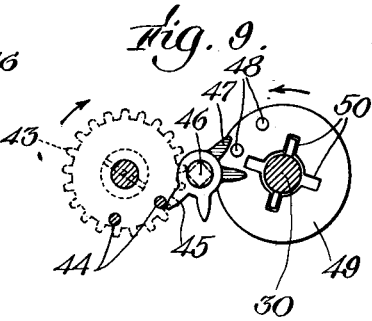
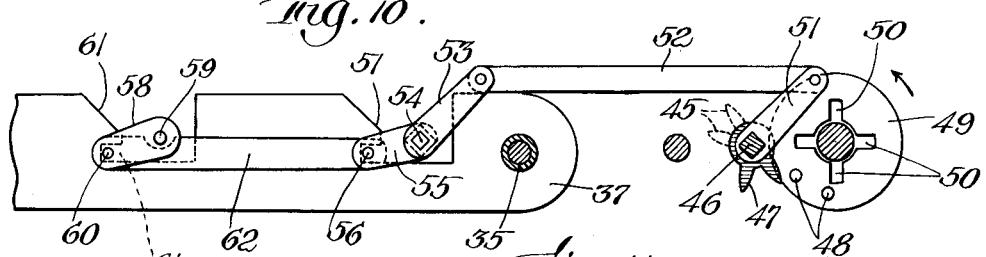
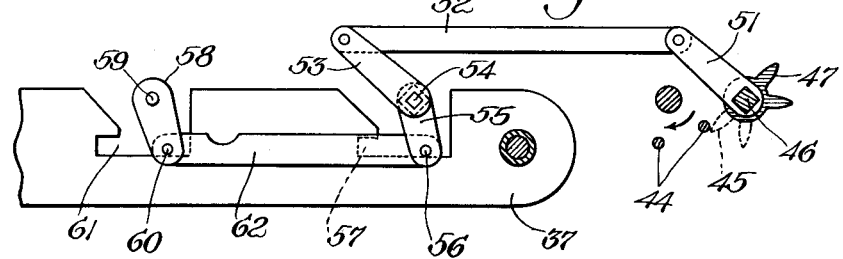

UNITED STATES PATENT OFFICE.

LOUIS ARKIN, OF BOSTON, MASSACHUSETTS.

CAMERA.

1,182,237.  Specification of Letters Patent.  Patented May 9, 1916.

Application filed May 14, 1915. Serial No. 28,194.

*To all whom it may concern:*

Be it known that I, LOUIS ARKIN, a citizen of the United States, and resident of Boston, in the county of Suffolk and State of Massachusetts, have invented new and useful Improvements in Cameras, of which the following is a specification.

This invention relates to cameras, and its principal object is to provide a camera wherein the film strip may be separated or severed within the camera and the exposed portion or portions safely removed for immediate developing and printing, leaving the unexposed or unused portion thereof within the camera in position for use.

The cameras heretofore provided and in common use, employ a film having provision for six or twelve exposures and it is the common experience of all persons familiar with their use that one or more of the first exposures is often made under circumstances which render it highly desirable that the picture thus taken be immediately available. Heretofore, however, so far as I am aware no efficient means have been provided to attain this end and the result has been and is, either that the developing and printing of the desired picture or pictures await the exposure of the rest of the film, which may consume considerable time so that the interest in an early exposure is gone, or the unused portion of the film is wasted either by being at once taken unused from the camera, or by rapid exposure on subjects of no interest to the operator and made merely to use up the film and thus make the desired picture or pictures immediately available.

It is the object of this invention to eliminate this objectionable and annoying feature and to provide a camera wherein after an exposure, or a predetermined number of exposures, have been made, the film strip may be severed within the camera and the exposed or used portion thereof safely removed and so become available for immediate developing and printing, leaving the unused portion of the film within the camera and in position for use as circumstances may thereafter demand.

Referring to the drawings which illustrate an embodiment of my invention, Figure 1 is a rear elevation of a camera embodying my invention; Fig. 2 is a similar view on an enlarged scale, partly broken away; Fig. 3 is a perspective view of the take-up roll; Fig. 4 is a section on the line 4—4, Fig. 2; Fig. 5 is a plan view of a film suitable for use in my improved camera; Fig. 6 is a section on the line 6—6, Fig. 2; Fig. 7 is a section on the line 7—7, Fig. 2; Fig. 8 is a section on the line 8—8, Fig. 2; Fig. 9 is a view similar to Fig. 8 but showing the parts in another position; Fig. 10 is a section on the line 10—10, Fig. 2; Fig. 11 is a view similar to Fig. 10 showing the parts in another position; Fig. 12 is a section on the line 12—12, Fig. 2; Fig. 13 is a section on the line 13—13, Fig. 2; Fig. 14 is a section on the line 14—14, Fig. 2; Figs. 15, 16 and 17 are detail views, partly in section and partly in elevation, showing the operating member and its associated mechanism in three different positions; Fig. 18 is a section on the line 18—18, Fig. 12; Fig. 19 is a section on line 19—19, Fig. 12; Fig. 20 is a section on the line 20—20, Fig. 19; and Fig. 21 is a detail view of the film separator.

1 is a box or casing provided with the usual sight opening 2 for observing the position of the film and having near one end a swinging door or cover 3 for the film roll chamber, fast on a rod 4 journaled in said casing. Said door 3 is provided with a spring catch 5 (Fig. 1) which coöperates with a complemental locking member or stud 6 on the inner wall of said casing yieldingly to lock said door in closed position. The catch 5 is preferably of the form shown consisting of a pair of stud retaining arms $5^a$ spaced apart and provided with apertures $5^b$ adapted to receive the notched complemental locking member or stud 6. Said arms $5^a$ are also provided with insets $5^c$ adapted to receive the head $5^d$ of the push pin $5^e$ which rests on the spring $5^f$. When the pin $5^e$ is depressed the head $5^d$ forces the arms $5^a$ out of engagement with the stud member 6 thus disengaging the catch. On the opposite sides of said casing are a pair of springs 7 having pins 8 which project through said casing and engage the film roll 9 on which the film 10 is carried, said roll being thus removably and rotatably secured within the casing. Near the other end of said casing 1 there is journaled a rod 11 (Fig. 4) having a bracket 12 fast thereon to which is secured a door or cover 13 for the take-up roll chamber having a spring catch 14. The end wall 15 of the casing 1 is fast on a rod 16 journaled in said casing and thus forms a swinging cover or door which has a locking member 17 adapted to coöperate with the spring catch 14 on the door 13 to lock said doors 13 and 15 in closed position. Fast on said rod 11 is a curved film guide 18 yieldingly held in operative position by springs 19 surrounding said rod 11 and engaging said guide. A stop 20 fast on said bracket 12 limits the inward movement of said guide. Fast to a rod 21 journaled in said casing is another curved film guide 22 yieldingly held in operative position by a spring 23 mounted in said casing.

The take-up roll S (Fig. 3) on which the film is wound in service, consists of a head 24 having a central opening and a head 25 having a central opening with radial slots 26. Between said heads are a plurality of rods or wires 27 spaced apart as shown to permit the end of the film strip to pass between any two thereof and to hold the film strip as it is being wound. The said roll is removably and rotatably mounted within the casing the head 24 being held by a spring 29 on the outside of said casing having a pin 28 passing therethrough,—and the head 26 by the operating member or key 30 hereinafter more particularly described. Mounted on the side of said casing 1 is a gear wheel 31 having radial slots 32 and meshing with gear wheel 33 which meshes with a gear wheel 34 mounted on a shaft 35 and having a slot 36. Said shaft 35 passes through a pair of feeder plates 37 spaced apart, and mounted on said shaft between said plates is a sprocket wheel 38 connected by a sprocket or feed chain 39, which carries a friction wiper of rubber or the like 40, with a sprocket wheel 41 journaled on said plates. Mounted in said casing by the side of said gear wheel 31, is a gear wheel 42 having radial slots 42ª and which meshes with a gear wheel 43 having a pair of lugs 44 adapted to engage and turn a pawl 45 secured to a shaft 46 mounted in said casing. Said shaft 46 has at the end opposite that carrying the pawl 45, a pawl 47 adapted to be engaged by lugs 48 on a disk 49 mounted in said casing and having radial slots 50. Fast on said shaft 46 is an arm 51 connected by a link 52 with an arm 53 secured to a shaft 54 journaled in said casing, and to which is secured a pair of arms 55 55 located on the opposite sides of said plates 37 and connected by a pin 56 passing through slots 57 in said plates. Another pair of arms 58 mounted on a shaft 59 are connected by a pin 60 which passes through slots 61 in said plates and said pins 56 and 60 are connected by a link 62. Mounted in said casing and immediately below said feed chain 39 are a pair of sprocket wheels 63 and 64 connected by a sprocket chain 65. Within said casing and in the rear of the take-up roll S is a light tight frame or partition 66 having a slot 67 through which the film 10 passes on its way to the rolls S. Movably mounted in said frame or partition is a film separator or cutter 68 having a slot 68ª which registers with the slot 67 when the cutter is in normal position. On the edges of said cutter which project beyond said frame, are racks 69 adapted to coöperate with pinions 70 carried by a shaft 71 mounted in said casing. Said shaft is further provided with a gear wheel 72 which meshes with gear wheel 73 mounted in said casing and having radial slots 73ª. The said cutter 68 is further provided with a spring 74 which engages the edge of the slot 75 in said frame 66, said spring being adapted to return the cutter to normal position as hereinafter described. Immediately in the rear of said frame 66 is a transverse rod 76 having a pawl 77 mounted thereon adapted normally to engage the film 10 near one edge thereof, and yieldingly held in operative position by a spring 78 surrounding said rod and engaging said frame 66. The casing below said pawl is recessed as shown at 79 (Fig. 20) so that the pawl may drop into said recess when not supported by the film 10 against which it normally rests. The rod 76 has at one end a locking lug or projection 80 which engages the gear wheel 72 and prevents rotation thereof when said pawl 77 is in normal engagement with said film strip. The operating member or key 30 passes through said gear wheels 31, 42 and 73, said disk 49 and said head 25 of the roll S and is provided with projections A and B spaced apart and adapted to engage the radial slots in said gear wheels, disk and head. The operating key is movable in and out and for convenience is provided with a guide 30ª and an indicator I is provided on the casing on which is indicated the three positions in which the key is to be placed to attain the desired results.

The film strip 10 in its preferred form (Fig. 5) differs from that in common use in that instead of having a continuous surface adapted for picture taking, the portions P, sensitive to light, on which the pictures are to be taken, are separated by blank portions D not adapted for the taking of pictures and having notches N adapted to facilitate the cutting of the film as hereinafter described. It will be understood that the portions P may be of a size as shown to permit the taking of a single picture before severing the film, or may be of such size as to permit the taking of any predetermined number of pictures before the severing mechanism is employed. The notched portions of the film at which the cutting takes place, are located at some distance in the rear of the portions P, so that the blank portions D are of sufficient length to permit a covering of blank film strip to be wound on the take-up roll adequate to protect the sensitive portions of the film which are on the take-up roll when the film strip is severed.

In use the operator opens the door 3 of the film roll chamber and secures the roll 9 carrying the film 10 in position as shown in Fig. 2, bringing the free end of the film strip upward over the rod or roller 81 shown in said figure, and inserting it in the space between the sprocket chains 39 and 65. The film is then in position to be fed to the take-up roll S.

To operate the feeding mechanism, the key 30 is brought into No. 1 position (Fig. 15). The projection A of said key is thus fitted into the slots 32 of the gear wheel 31 and the slots 42ª of the gear wheel 42. Normally, as best shown in Fig. 12, the feeder plates 37 and feed chain 39, with its wiper 40, are held away from the film strip 10; but upon the rotation of said key 30 in position No. 1, gear wheel 42 turning in the direction of the arrow (Fig. 7) rotates gear wheel 43 so that the lugs 44 carried thereby engage and turn pawl 45 from its normal position, shown in Figs. 7, 8 and 10, to the position shown in Figs. 9 and 11. This movement of said pawl 45 being transmitted to the pins 56 and 60 which connect the arms 55 and 58 respectively, on opposite sides of the feeder plates 37, causes the said pins to move in the slots 37 and 61 and to press the said feeder plates downward toward the film strip from the normal position shown in Fig. 10 to the working position shown in Fig. 11, the parts assuming the position shown in said figure. It will be understood that in their downward movement above described, the feeder plates 37 carry with them the sprocket wheels with the chain 39 and wiper 40, and that the shaft 35 moves downward in the slot 36 of gear wheel 34 provided for that purpose. The said feed chain with its friction wiper being thus brought into working position, further rotation of said key in No. 1 position being transmitted to shaft 35 through gear wheels 31, 33 and 34, rotates said shaft and the sprocket wheel 38 fast thereon thus causing the feed chain 39 to turn on its wheels 38 and 41 and the friction wiper 40 carried by said chain engaging the film strip 10 at one edge thereof, feeds it forward through the slot 67 in the frame 66 to the take-up roll S. When the film passes through said slot 67, it comes in contact with the guide 18 and is turned downward between the wires or rods of the roll S, as best shown in Fig. 4. When the film reaches the position shown in said Fig. 4, the feeding operation has been completed, and the operator moves the key 30 into No. 2 position shown in Fig. 16, whereupon the projection A of said key enters the slots 50 of the disk 49 and its projection B enters the slots 26 of the take-up roll head 25. When now the key 30 is rotated, the lugs 48 on said disk 49 engage and turn the pawl 47 and said turning movement being communicated to the pins 56 and 60 through their articulated connections with said pawl, lifts the plates 37 and the feeding mechanism carried thereby from active position shown in Fig. 11 to normal inactive position shown in Fig. 10. When this return of the feeder to normal position has been accomplished, further rotation of said key 30 turns the roll S and the film strip being directed by the guides 18 and 22, is readily wound on to said roll in the usual way until the usual mark on the film indicating that it is in position for the first exposure, is observed through the sight 2.

When the first exposure has been made and it is desired to remove the exposed portion of the film for developing and printing without waiting for the exposure of the remainder of the film, the key 30 is placed in position No. 2 (Fig. 16) and rotated, thus turning the take-up roll S and winding the film strip 10 thereon until a suitable mark on said strip, such as the letter K, is observed through the sight. The said mark K, as shown in Fig. 5, is on that portion of the film having the notch N so that when said mark K is observed through the sight 2 the pawl 77 which normally engages said film has dropped through the notch N to the position shown in dotted lines in Fig. 20 out of engagement with the film strip. The dropping of said pawl 77 turns the shaft 76 on which it is mounted and moves the locking pin 80 out of engagement with the gears of gear wheel 72 which is thus left free to rotate. As soon as the said mark K is observed through the sight the operator moves the key 30 from No. 2 position to No. 3 position shown in Fig. 17, whereupon the projection A of said key engages the radial slots 73ª of the gear wheel 73. When now said key 30 is turned, its rotary movement is transmitted through gear wheels 73 and 72 to shaft 71 which carries the pinions 70 causing said pinions to engage the racks 69 on the film separator or cutter 76 forcing said cutter upward and severing the film strip at the point where it passes through the slot 67. The upward movement of said cutter compresses the spring 74 secured thereto, and when the racks 69 pass out of engagement with the pinions 70, said spring immediately returns the cutter to normal position. When the film has thus been severed the doors 13 and 15 are opened and the roll S carrying the exposed, severed portion of the film is removed. This removal of the exposed portion of the film is without danger of injury from light because, as stated above, the severing of the film strip can take place only when the severing mechanism is unlocked by the falling of the pawl 77 through the film strip notch N, and said notch is located at a sufficient distance behind the sensitive portion P to provide for an adequate covering of blank film strip to be wound on the take-up roll before the notch N reaches the pawl 77. When the roll S carrying the severed film strip has been removed, a new roll S is placed in position in the take-up roll chamber. The feeder is then brought into engagement with the film strip and operated to feed the remaining unexposed portion of said strip to the new roll S in the manner already described, and when the feeding has been completed the said roll is rotated to wind the film thereon as described above, until the mark indicating that the film is in position for the second exposure is observed through the sight.

As hereinabove noted the pin 80 which normally engages gear wheel 72, prevents the operation of the film separator except when the film strip is in cutter position. It is also desirable to provide means for locking the feeder against downward movement and for locking the feed chain against movement. The feeder lock (Figs. 2 and 14) consists of a lever 82 pivoted on the casing and having a tail 83 which passes through a slot 83ª (Fig. 14) and is adapted to be engaged by the head 25 of the roll S when said roll is secured within the casing. The opposite end of said lever is notched and adapted to engage the gears of gear wheel 42. When the roll S is secured within the casing, its head 25 engages the pawl 83 and holds the lever 82 out of contact with said gear wheel 42; but when said roll is removed, the spring 82ª forces and holds the notched end of said lever against the said gear wheel 42 so that the feeder cannot be moved downward to engage and feed the film strip when there is no take-up roll to receive it.

The lock for the feed chain consists of a pawl 84 (Fig. 6) pivoted on the casing and having a lug 85 adapted to be engaged by a lug 86 fast on the rod 16 which carries the door 15. A spring 87 engages said pawl and normally urges it against the gears of gear wheel 31. When the door 15 is closed, the lug 86, engaging the lug 85, holds said pawl out of engagement with gear wheel 31; but when said door is open, the spring 87 forces and holds said pawl against the gears of said wheel in the dotted line position shown in Fig. 6, thus preventing movement of the feed chain 39 and consequent feeding forward of the film 10 while the doors 13 and 15 are open.

I claim:

1. In a camera, a film roll, a take-up roll and a separator to sever the film strip between said two rolls.

2. In a camera, a film roll, a take-up roll and a separator to sever the film strip between said two rolls and a film feeder adapted to feed the severed end to the take-up roll.

3. In a camera, a film roll, a take-up roll and a separator to sever the film strip between said two rolls and a friction wiper adapted to feed the severed end to the take-up roll.

4. In a camera, a film roll chamber, a take-up roll chamber, a film roll and a take-up roll in the respective chambers, a light tight partition between said chambers, and a film separator adapted to sever the film strip within the camera.

5. In a camera, a film roll chamber, a take-up roll chamber, a film roll and a take-up roll in the respective chambers, a light tight partition between said chambers, and a film separator movably mounted in said partition adapted to sever the film strip within the camera.

6. In a camera, a film separator adapted to sever the film strip within the camera, means to actuate said separator to sever the film strip, means to return the separator to normal position, and means to lock said actuating means in normal position.

7. In a camera, a film separator adapted to sever the film strip within the camera, means to actuate said separator to sever the film strip, means to return the separator to normal position, and means adapted to coöperate with the film strip to lock and unlock said actuating means.

8. In a camera, a film separator adapted to sever the film strip within the camera, means to actuate said separator to sever the film strip, means to return the separator to normal position, and locking means comprising a member normally engaging the film strip, said locking means adapted to lock said actuating means when said member is in engagement with the film strip and to unlock said actuating means when said member moves out of engagement with said strip.

9. In a camera, a film roll chamber, a takeup roll chamber, a partition between said chambers, a film separator mounted in said partition and having racks on its opposite edges, rotatably mounted pinions adapted to coöperate with said racks to actuate the separator to sever the film strip within the camera, and means to return the separator to normal position.

10. In a camera, a film roll chamber, a takeup roll chamber, a partition between said chambers, having a slot, a film separator adapted to sever the film strip within the camera and having a slot registering with said partition slot when the separator is in normal position.

11. In a camera, a film roll chamber, a takeup roll chamber, a partition between said chambers having a slot, a film separator movably mounted in said partition and having a slot registering with said partition slot when in normal position, means comprising racks on opposite edges of said separator, and rotatably mounted pinions to actuate said separator to sever the film strip within the camera, and means to return the separator in normal position.

12. In a camera, a film roll chamber and a take-up roll chamber, a partition between said chambers, a film separator mounted in said partition adapted to sever the film strip within the camera, means comprising racks on said separator and rotatably mounted pinions to actuate the separator to sever the film, and means comprising a spring fast on said separator and engaging said partition to return the separator to normal position.

13. In a camera, a film roll, a take-up roll and a film feeder adapted to feed the film strip to the take-up roll, and means to move said feeder as a unitary structure into and out of engagement with the film strip.

14. In a camera, a film roll, a take-up roll and a film feeder adapted to feed the film strip to the take-up roll and means comprising an operating member and connections between said member and said feeder to move said feeder as a unitary structure into and out of engagement with said film strip.

15. In a camera, a film roll, a take-up roll and a film feeder adapted to feed the film strip to the take-up roll, means comprising an operating member, pawls adapted to be operated thereby and an articulated connection between said pawls and said feeder, to move said feeder as a unitary structure into and out of engagement with said film strip.

16. In a camera, a rotatably mounted take-up roll adapted to permit the passage of the film therethrough, a feeder to feed the film strip to said take-up roll and a guide to direct the strip into said roll.

17. In a camera, a rotatably mounted take-up roll comprising heads joined by rods spaced apart, a feeder to feed the film strip to said take-up roll and a guide to direct the strip through said roll.

18. In a camera, a rotatably mounted take-up roll adapted to permit the passage of the film strip therethrough, an operating member adapted to engage said roll to rotate the same, a feeder to feed the film strip to said take-up roll and a guide to direct the strip through said roll.

19. In a camera, a rotatably mounted take-up roll adapted to permit the passage of the film strip therethrough, a feeder to feed the film strip to said take-up roll and yieldingly mounted guides adapted to engage the film strip as it is wound on said take-up roll.

20. In a camera, a take-up roll chamber, a door for said chamber, a take-up roll in said chamber, a feeder to feed the film strip to said take-up roll, means to actuate said feeder, and means adapted to be actuated by the movement of said door to lock said feeder actuating means when said door is open.

21. In a camera, a take-up roll chamber, a door for said chamber, a take-up roll in said chamber, a feeder to feed the film strip to said take-up roll, means to actuate said feeder, and means adapted to be actuated by the movement of said door to lock said feeder actuating means when said door is open, comprising a spring pressed pawl, and a lug, said lug carried by said door and adapted to hold said pawl out of engagement with said actuating means when said door is closed and to permit engagement therewith when said door is opened.

22. In a camera, a take-up roll, a feeder to feed the film strip to said roll, means to move said feeder into and out of engagement with said film strip, and means adapted to be actuated by removal of said roll to prevent the movement of said feeder into engagement with the film strip.

23. In a camera, a take-up roll, a feeder to feed the film strip to said roll, means to move said feeder into and out of engagement with said film strip, and means comprising a pivoted lever adapted to be actuated by removal of said roll to prevent the movement of said feeder into engagement with the film strip.

24. In a camera, a film roll, a takeup roll, a film feeder normally out of engagement with the film strip, a rotatably mounted operating member, and connections between the feeder and said operating member whereby rotation of said member moves said feeder into engagement with the film strip and thereafter feeds the film strip to the takeup roll.

25. In a camera, a film roll, a takeup roll, a film feeder to feed the film strip to the takeup roll, a rotatably mounted operating member, and connections between said operating member and said feeder whereby rotation of said operating member simultaneously moves said feeder out of engagement with said film strip and rotates said takeup roll to wind the film strip thereon.

26. In a camera, a film roll, a takeup roll, a feeder, means to actuate said feeder to engage the film strip and feed it to the take-up roll, means to actuate said feeder to move it out of engagement with the film strip, a separator, means to actuate said separator to sever the film strip within the camera, and an operating member movable into a plurality of operating positions and adapted when in any operative position to actuate any one of said actuating means without affecting the others.

27. In a camera, a film roll, a takeup roll, a feeder, means to actuate said feeder to engage the film strip and feed it to the takeup roll, means to actuate said feeder to move it out of engagement with the film strip, and an operating member movable into a plurality of operating positions and adapted when in one position to engage said feeder actuating means to move said feeder into engagement with the film strip and feed the strip to the takeup roll and when in another position to engage said feeder actuating means and said takeup roll to move said feeder out of engagement with the film strip and simultaneously wind the strip on the takeup roll.

Signed by me at Boston, Massachusetts, this 10th day of May, 1915.

LOUIS ARKIN.

Witnesses:
    CHARLES D. WOODBERRY,
    JOSEPHINE H. RYAN.